United States Patent [19]

Wang

[11] Patent Number: 4,540,306
[45] Date of Patent: Sep. 10, 1985

[54] POSITIONING JOINT FOR FOLDING LADDERS

[76] Inventor: Chien-Yuan Wang, No. 17, Alley 6, Lane 24, Pa Te Rd., Sec. 4, Taipei, Taiwan

[21] Appl. No.: 543,445

[22] Filed: Oct. 19, 1983

[51] Int. Cl.³ .................. F16C 11/00; E05D 11/10; E06C 7/50
[52] U.S. Cl. ............................... 403/93; 182/163; 16/332; 16/334; 16/349
[58] Field of Search ........... 403/95, 93, 102, 96, 403/328, 322; 297/367, 365; 182/163, 164; 16/332, 334, 349, 325, 324, 344

[56] References Cited

U.S. PATENT DOCUMENTS

| | | | |
|---|---|---|---|
| 3,412,420 | 11/1968 | Seckerson | 16/324 |
| 3,655,012 | 4/1972 | Hoffman et al. | 182/163 |
| 3,955,240 | 5/1976 | Schuh et al. | 403/93 |

FOREIGN PATENT DOCUMENTS 2370885  7/1978  France .................. 403/96

Primary Examiner—Cornelius J. Husar
Assistant Examiner—Peter M. Cuomo
Attorney, Agent, or Firm—Burns, Doane, Swecker & Mathis

[57] ABSTRACT

A joint having two joint members which are pivotable with respect to each other about a common axis is lockable in a series of predetermined angular positions by engaging a spring-biased pawl provided within one member in notches formed at the peripheral edge of the other member. In manually operating the joint, the forked release element and the handle pivotably connected with each other act as an operating lever in cooperation with the clawed, spring-loaded control means in controlling locking and unlocking of the joint. The claw like stop portion of the control means, when being pushed to one side within the slot having its length at least twice longer than the width of the notch by the release element in counter-clockwise direction, permits engagement of the pawl in the notches and, upon operation of the handle thereby disengaging the pawl from the notches, returns to rest position under its spring force in clockwise direction. In this position, the stop portion, by pressing against the back of the release element in blocking the pawl from falling back to the notches, effectively prevents engagement of the pawl in the notches to permit free pivoting of the joint.

2 Claims, 6 Drawing Figures

POSITIONING JOINT FOR FOLDING LADDERS

Reference is given here to applicant's prior U.S. application with Ser. No. 532,096, filing date Sept. 14, 1983.

DETAILED DESCRIPTION

The present invention relates to a joint for positioning used for folding ladders, and more particularly, to a joint in which the prior sector-shaped ratchet is replaced with a clawed control means disposed within the inner side of one sidewall of the disk and pivotably mounted on an axial pivot, between one side thereof and the other sidewall of the disk being provided with a tension spring, having same number of claw arms as there are open notches on the peripheral edge of the disk with each arm having its free end bent axially and protruded out through the slots respectively.

Various joints for positioning used for folding ladders have been proposed (see, for example, West German Patent No. 2052284 to Hoffmann). The conventional joint comprises two joint members pivotably connected with each other. The first joint member has at its front end a disk portion composed of two spaced-apart symmetrically arranged circular plates between which there are provided a spring-biased locking element and an operating lever. The rear end of the first joint member is a tubular portion adapted to hold one end of a ladder section. The second joint member has at its front end a hollow, flat locking disk formed of a pair of circular shell halves enclosing a holding disk or sector-shaped ratchet, and at its rear end a tubular portion adapted to be connected to the other end of the ladder section. Distributed circumferentially about the circular extent of disk are open notches engagable with the locking element of the first joint member to be determined by the desired relative angular position of the two joint members. The locking disk of the second joint member is sandwiched between the two circular plates of the first joint member, and the two joint members are securely held together by a common bolt or pivot in a manner that the first and second joint members can pivot with relation to each other about the bolt. In such a joint, the sector-shaped ratchet provided within the shell halves of the second joint member is effective in preventing return of the locking element into the notch when the latter is disengaged from its associated notch upon operation of the operating lever, while disclosing the notch at the desired position for it to engage. That is, upon shifting of the lockable positions or folding and unfolding of the ladder sections, the ratchet acts to permit or hinder engagement of the locking element in the respective notches by disclosing or closing the appropriate notch.

However, since the ratchet is formed with peripheral teeth each of which projects outwardly of the joint through a notch, the outwardly projecting teeth tend to cause injuries to the user. In addition, such teeth may result in malfunction of the joint due to susceptibility to damage when encountering impacts or external forces. All these create the causes for users to worry about the safety use of such joints. Moreover, since the locking disk of the second joint member is constructed of two symmetrically superposed shell halves of sheet metal, it will be rather cumbersome to assemble the ratchet and the spring for biasing the ratchet within the locking disk during its manufacture. Still further, the presence of the gapping place in the peripheral edge of the locking disk for the teeth of the ratchet to move about, will also make possible penetrating of dirt, or other contamination into the interior of the second joint member and thereby causes malfunction of the ratchet.

Accordingly, the present invention overcomes aforesaid disadvantages by providing an improved joint which insures safety in use while being easy to operate. The principal object of this invention is to provide a joint with a mechanism which will eliminate the defects associated with a joint with conventional sector-shaped ratchet.

It is another object of the invention to provide a joint which employs a clawed, spring-loaded control means provided with radially extended arms having free ends, the stop portions, well protruded out through slots at least twice wider thereto, to stop or release the movement of the operating lever in order to permit or hinder engagement of the locking element in the notches so as to adjust the joint in a desired angular position.

Still another object of the invention is to provide a joint with open notches on the peripheral edge of the disk having no projections provided thereon to cause injuries to the users and to comply with the requirements for American Safety Standards.

Other features of the present invention will become apparent from the following detailed description to be taken in conjunction with the annexed drawings wherein.

Figure 1:
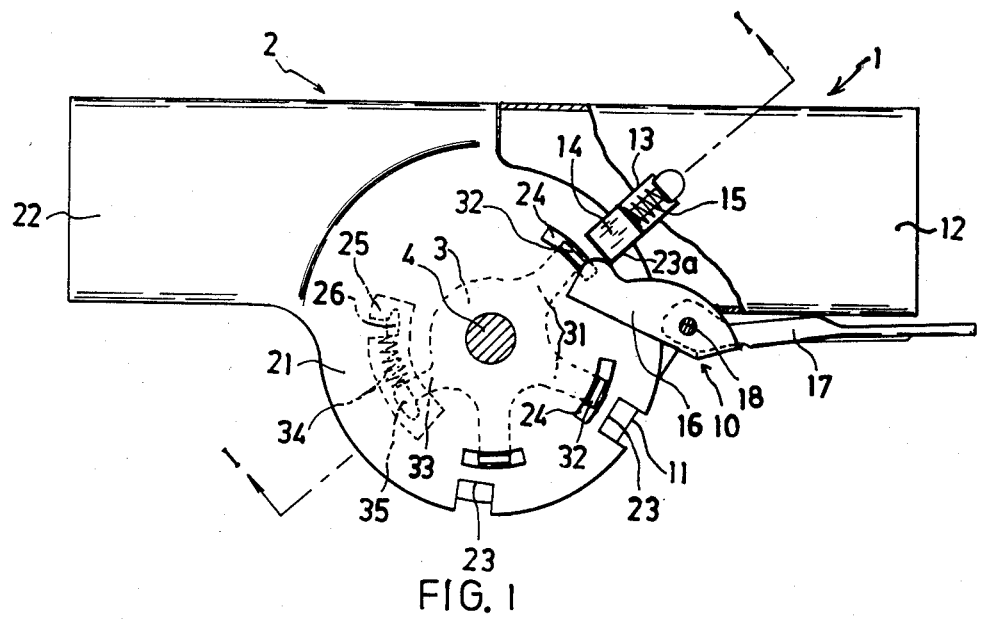
FIG. 1 is a partially sectional view of a joint according to the present invention.

The positioning joint according to the present invention comprises, as shown in FIG. 1, a first joint member 1 and a second joint member 2. The construction of the joint member 1 is generally similar to a conventional one, i.e., it may be formed, for example, of sheet metal pressed into a disk portion 11 having two spaced-apart, symmetrically disposed circular plates and a tubular portion 12. The tubular portion 12 is provided with two rectangular slots 13, one on each side thereof, and an oblong-shaped pawl 14 slidably engaged at both ends in the slots 13 and spring-biased by spring 15. The manually operated operating lever 10 is pivotably connected to the disk portion 11 by pivot pin 18 disposed close to the tubular portion 12. The operating lever is composed of a forked release element 16 and a handle 17.

The joint member 2 is also structured in a conventional manner, i.e., formed of sheet metal by pressing. It comprises a hollow, flat locking disk 21 formed of a pair of circular shell halves, and a tubular portion 22 formed integrally thereof. The locking disk 21 is provided with peripherally distributed open notches 23 formed at the closed circumferential edge. Internally of the locking disk 21 there is a rotatable, clawed control means 3 located in one inner side wall of the disk 21 and pivoted by a common axial bolt 4. The control means 3 is provided with radially extended claw arms 31 being equal in number to the notches 23 at the periphery of the locking disk 21. Each of the arms 31 has its free end bent axially at one side at right angles to the arm to form a claw like stop portion 32. Inner to each aforesaid notch 23 on one side wall of the locking disk 21 where the stop portions 32 are pointing at, there are formed arc-shaped slots 24. The length of each slot 24 is at least twice the width of the notch 23 and slots 24 extend in a counter-clockwise direction. The claw arms 31 are so arranged that each arm with the stop portion 32 at its free end protruding out through a slot 24 is associated with a notch 23. The locking disk 21 on the other side wall opposite the side whereon are located the slots 24 is formed an arc-shaped opening 25 with a hook-like projection 26 therefrom projecting into the opening. From one edge of the clawlike control means 3 there is extended a claw projection 33 with ending in a hook portion 35. A tension spring 34 is located in the opening 25 having its two ends hooked around the hook-like projections 26, 35 respectively. The control means 3 is thereby biased by the tension spring 34 in a clockwise direction into a position such that each protruding stop portion 32 abuts against one edge of the slot 24 when the pawl 14 is in unlocked position, as appears in FIGS. 2, 3.

Figure 5:
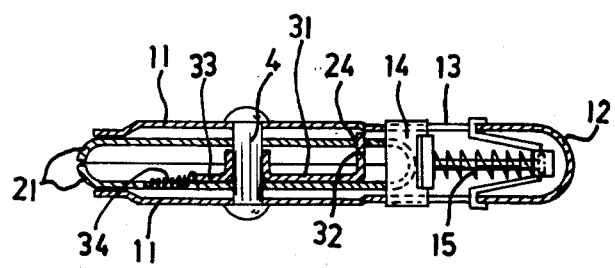
FIG. 5 is a sectional view of FIG. 1 in section along line I—I.

The joint members 1, 2 in accordance with the present invention are pivotably connected together as an unit by the axial pivot 4, that is, the locking disk of the second joint member 2 is sandwiched between the two circular plates of the first joint member 1. When the joint is fully extended, i.e., when the tubular portions 12, 22 of the members 1, 2 respectively are in alignment as seen in FIGS. 1, 5, the pawl 14 is then engaged in the open notch 23a and while the front end of the forked, release element 16 is being urged by the resilient force of the pawl 14 and the stop portion 32 of the claw-like control means 3 in a counter-clockwise direction, the handle 17 is thereby caused to lie against the underside of the tubular portion 12.

Figure 2:
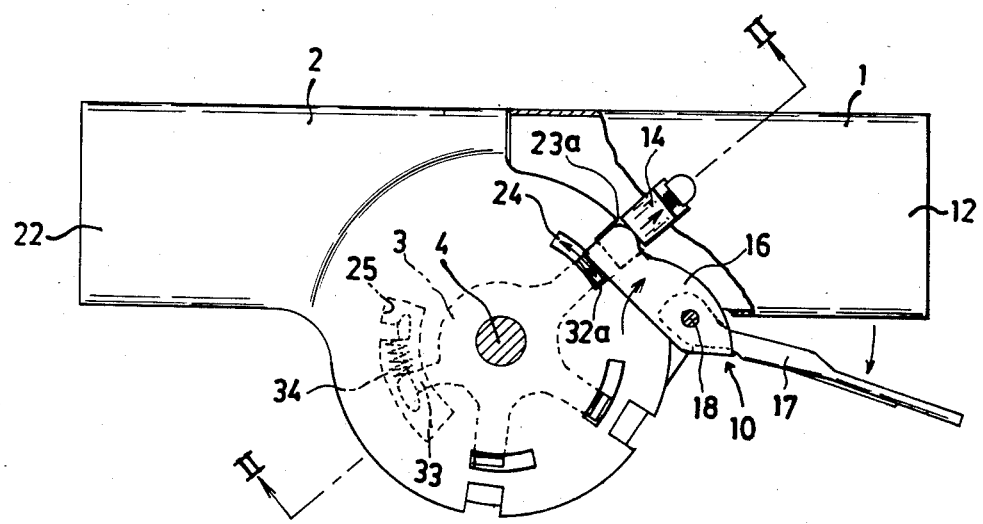
FIG. 2 is the schematic view 1 of operating the joint in accordance with the invention.
Figure 3:
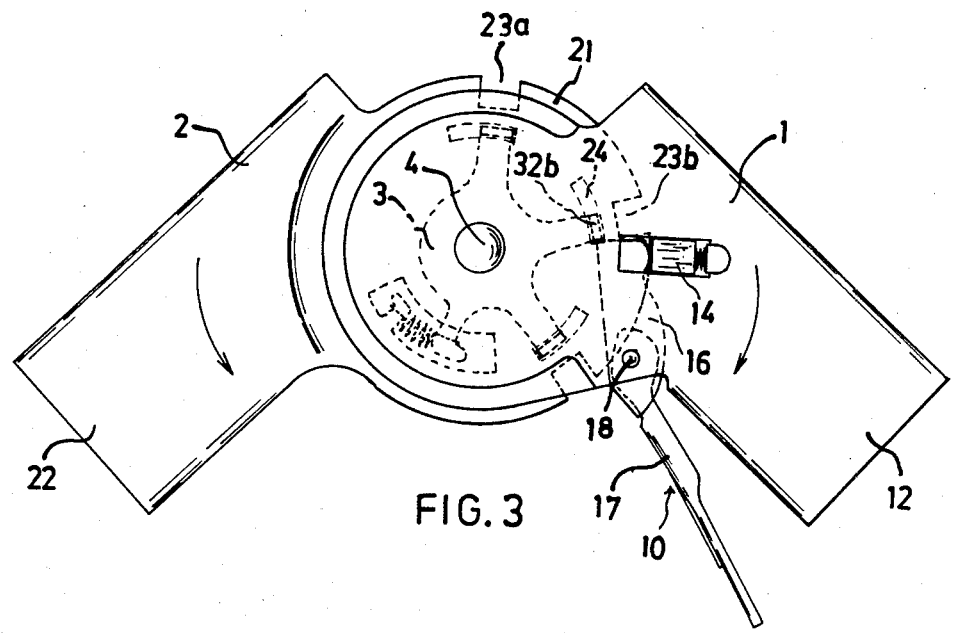
FIG. 3 is the schematic view 2 of operating the joint in accordance with the invention.
Figure 4:
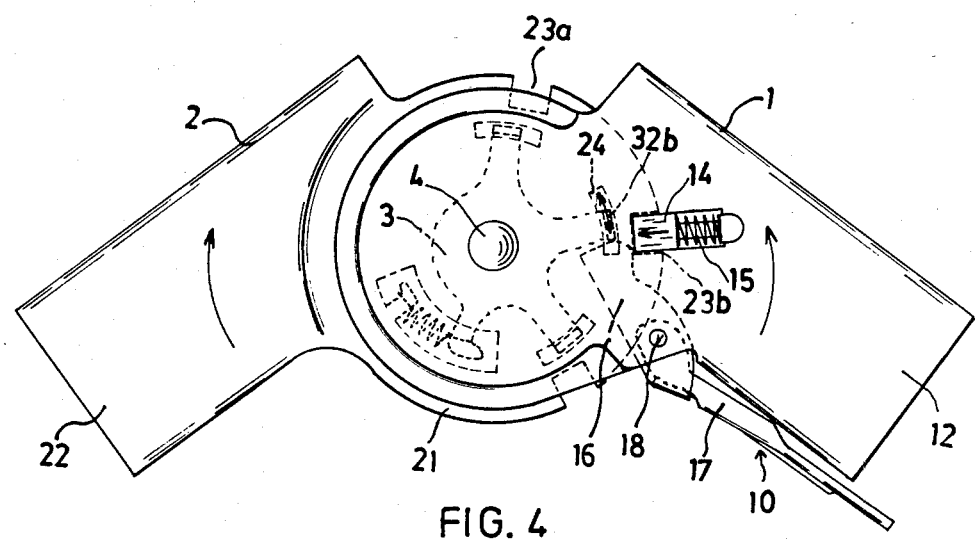
FIG. 4 is the schematic view 3 of operating the joint in accordance with the invention.
Figure 6:
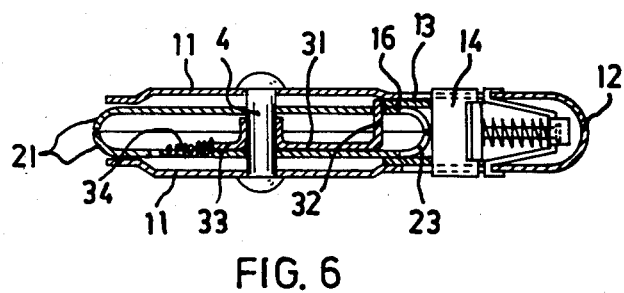
FIG. 6 is a sectional view of FIG. 2 in section along line II—II.

FIGS. 2, 6 illustrate the position in which the pawl 14 is being released from engagement in the notch 23a of the disk 21. Upon swinging the handle 17 about the pivot pin 18 away from the tubular portion 12 of joint member 1, the release element 16 of the operating lever turns in closkwise direction against the resilient force of the spring 15, thereby pushing the stop portion 32 of the control means further in counterclockwise direction and concomitantly lifting the pawl 14 from engagement in the notch 23a. When the pawl 14 moves to an edge of the notch 23a, the underside of the release element 16 slides over the outer surface of the stop portion 32. As being released from the outside action, the stop portion 32 immediately snaps back to its normal position in clockwise direction under the resilient force of the spring 34 and lies against the underside of the release element 16, thus preventing the latter from moving further inside the disk 21 and thereby stopping the pawl 14 from falling back in the notch 23a. The joint members 1, 2 according to the present invention can now be pivoted freely with respect to each other without any interference. With reference to FIG. 3, upon pivoting of the joint members 1, 2 the pawl 14 slides along the smooth circumferential portion of the disk 21 of joint member 2. When the pawl 14 passes through notch 23b, as the underside of the release element 16 slides over along the outer surface of the stop portion 32b and can not turn round in counter-clockwise direction, the pawl 14 is thus prevented from falling into the notch 23b by the release element 16. To enable the pawl 14 to be engageable in the notch 23b, the pawl 14 must first pass the notch 23b to permit the front side of the release element 16 to pass through the stop portion 32b. The joint member 1, 2 are then pivoted with respect to each other in a way as indicated by arrows in FIG. 4. Since the front side of the release element 16 is being blocked by the stop portion 32b, when release element 16 and member 1 move concomitantly in an opposite direction, the front side of the release element 16 pushes the stop portion 32b away against the resistance of the spring 32 in a counterclockwise direction. The pawl 14 and the underside of the release element 16 are thus released of any resistance. As a result when the pawl 14 passes over the notch 23b, it is biased by the elastic action of the spring 15 and locked in the notch 23b. Hence another angular position is effectively secured.

The construction of the clawed control means, as disclosed in the applicant's prior application, is such that the outwardly projecting claw or stop portion through the slit or slot prevents the engagement of the pawl within the notch, while the prevention of its projection through the slots because of the downward inclination deformation of the depressed arm of the clawed control means permits the pawl to be maintained in locking engagement within the notch. The clawed, spring loaded control means 16 according to the present invention has its clawlike stop portions 32 permanently protruded out through the slots. The forked release element 16 is in constant contact with the spring-biased pawl 14 and is also in contact with one stop portion 32 when the pawl is engaged in a notch 23 relative to the stop portion. Upon swinging of the handle 17, the clawed control means 16 immediately disengages the pawl 14 from the notch 23 while the stop portion 32 moves in clockwise direction under the resilient action of the spring 34 and lies against the underside of the release element 16, thereby preventing the release element 16 from moving further and the pawl 14 is kept away from said notch 23. When a desired angular position is to be secured, pivoting of the joint members 1, 2 causes the upperside of the release element 16 to pass over and push the next stop portion 32 away in counterclockwise direction, so that the notch 23 relative to said stop portion is disclosed to receive the pawl 14. Hence the clawed, spring-loaded control means with radially arranged arms serves effectively the purposes of locking as well as unlocking in the positioning joint and its functions are well established. Furthermore, since there is no projection formed at the circumference of the locking disk 21, the entire joint according to the invention is in conformity with the standards of American safety inspection.

I claim:

1. A positioning joint used for folding ladders comprising:

a first joint member formed with a disk portion composed of a pair of spaced-apart, opposed circular plates from which extends a flat tubular portion having in opposite sides thereof two slots through which is slidably supported a spring-biased pawl operable by an operating lever pivotably connected to said tubular portion and having a release element;

a second joint member formed with a flat, hollow locking disk from which extends a tubular portion, said locking disk provided with a plurality of peripherally distributed notches engageable with said pawl and a control means for controlling opening and closing of said notches;

said first and second joint members being pivotably connected together by a common axial bolt passed through the centers of disk portion of the first joint member and the locking disk of the second joint member which is concentrically sandwiched between the plates of said disk portion;

and characterized in that one side of the hollow locking disk of the second joint member is formed adjacent the respective notches with a corresponding plurality of slots, the length of each slot being at least twice the width of said notches, the other side of said locking disk is formed with a long opening and said control means is pivotably rivetted by said axial bolt to one inner surface of one side of the locking disk;

wherein said control means is formed with same number of claw arms relative to notches on the locking disk, the free ends of said arms are bent at right angles to the arms to form stop portions which protrude out through the slots of the locking disk; a spring is provided secured one end to a hook portion being formed at the end of the claw projection which extends out from the control means and the other end to a hook-like projection being provided on the same side of the locking disk where said long opening is formed and into which said projection projects; and said end portions, each protruding through a respective slot of the locking disk, act as an one-way stop means for the release element of the operating lever in disengaging the pawl when said release element is disposed in between the edge leading to said notch and the outer surface of said end portion whereby said pawl is prevented from falling back into the notch.

2. A positioning joint according to claim 1 further characterized in that the breadth of the upperside of said release element, whereby said pawl is disengageable with the notch, is greater than or equal to the radial distance between the outer surface of said end portion and the periphery of said locking disk.

* * * * *